United States Patent
Orleth et al.

[11] Patent Number: 5,872,789
[45] Date of Patent: Feb. 16, 1999

[54] METHOD FOR REDUCING JITTER OF ATM CELLS

[75] Inventors: Robert Orleth, München; Stefan Hintermaier, Bruckmühl; Anton Steinmaier; Thomas Gemmer, both of München, all of Germany

[73] Assignee: Siemens Aktiengesellschaft, Munich, Germany

[21] Appl. No.: 849,650

[22] PCT Filed: Nov. 22, 1995

[86] PCT No.: PCT/DE95/01628

§ 371 Date: May 29, 1997

§ 102(e) Date: May 29, 1997

[87] PCT Pub. No.: WO96/18279

PCT Pub. Date: Jun. 13, 1996

[30] Foreign Application Priority Data

Nov. 30, 1994 [DE] Germany ............... 44 42 654.2

[51] Int. Cl.⁶ ................................. H04L 12/56
[52] U.S. Cl. ............................. 370/517; 375/372
[58] Field of Search .................. 370/516, 517, 370/391, 394, 411, 413, 252, 395, 465, 468; 375/371, 372

[56] References Cited

U.S. PATENT DOCUMENTS

| | | | |
|---|---|---|---|
| 3,631,343 | 12/1971 | Schmidhauser | 324/106 |
| 4,009,371 | 2/1977 | Hamilton et al. | 377/52 |
| 5,559,796 | 9/1996 | Edem et al. | 370/412 |
| 5,563,885 | 10/1996 | Witchey et al. | 370/391 |
| 5,630,113 | 5/1997 | Hayssen, III et al. | 395/558 |
| 5,640,388 | 6/1997 | Woodhead et al. | 370/468 |

FOREIGN PATENT DOCUMENTS 0 485 971 A2  5/1992  European Pat. Off. .
41 32 518 C2  7/1994  Germany .

OTHER PUBLICATIONS

Electronics and Communications in Japan, Part 1, vol. 76, No. 12, Dec. 1993, Cell Delay Variation Smoothing Methods for ATM–Based SDH Signal Transport System, pp. 14–27.

*Primary Examiner*—Chau Nguyen
*Assistant Examiner*—Kenneth Vanderpuye
*Attorney, Agent, or Firm*—Hill & Simpson

[57] ABSTRACT

In ATM networks, the information transmitted in ATM cells is subject to jitter. This should be avoided particularly in the transmission of video signals and voice signals. The method provides a remedy here by reading the ATM cells into a buffer memory at the transmission clock rate and by reading them out again using the average value of the jitter.

8 Claims, 1 Drawing Sheet

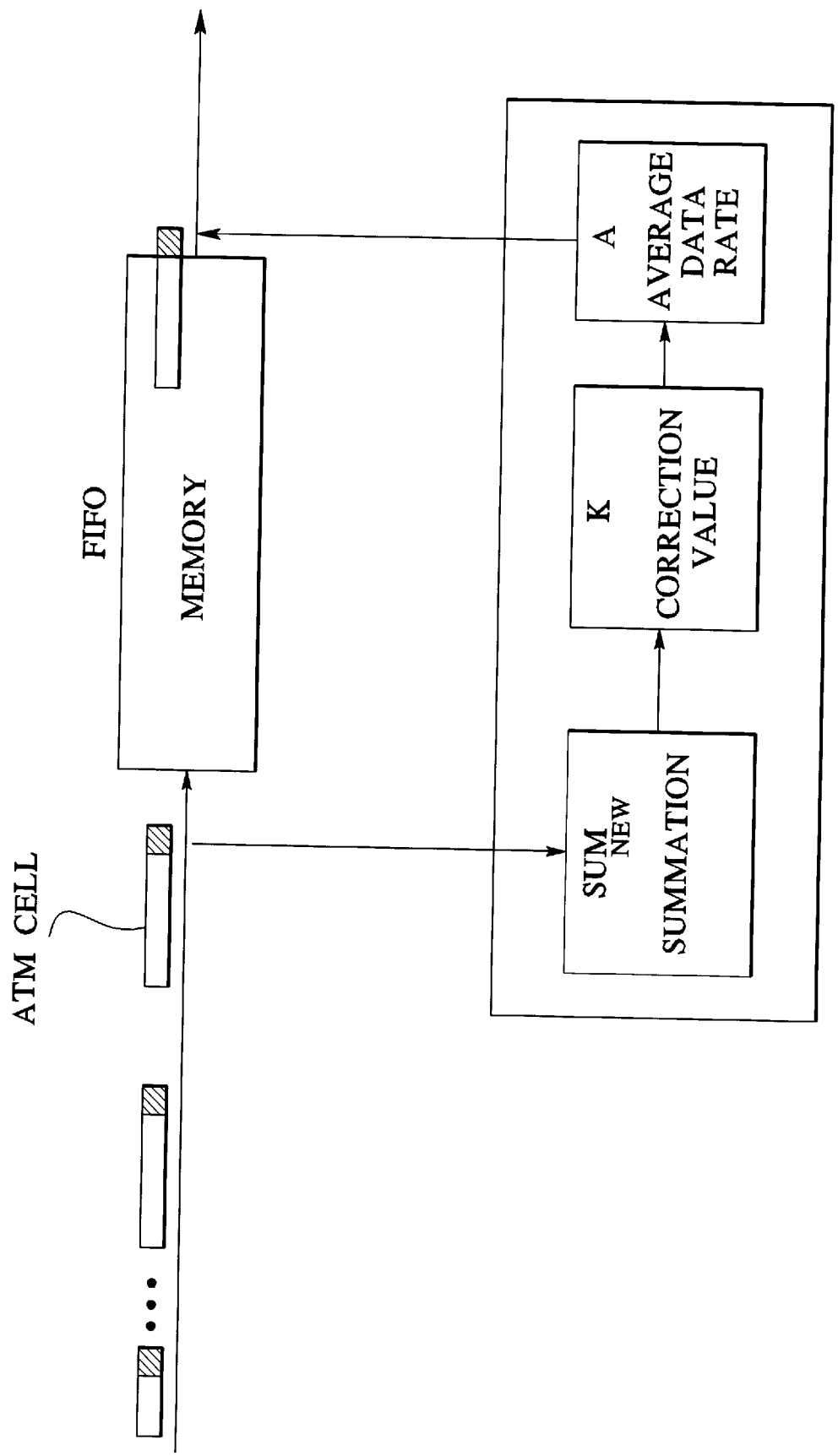

METHOD FOR REDUCING JITTER OF ATM CELLS

BACKGROUND OF THE INVENTION

In ATM communications networks, information is transmitted in the form of packets or cells according to an asynchronous transmission mode (Asynchronous Transfer Mode, ATM). In these ATM networks, jitter of the ATM cells occurs, dictated by the system, during the transmission operation. Jitter is generally produced by buffering of the ATM cells, which is carried out in a network node, and depends on a number of parameters. Thus, for example, the number of nodes in the network, the loading (that is to say how many bits/s are transmitted) and the nature of the traffic (that is to say whether a variable bit rate is transmitted) have a direct influence on the jitter magnitude. The jitter of an ATM cell thus fluctuates between 0 (optimum value, in other words no jitter) and a maximum value. The occurrence of jitter is particularly disadvantageous when the transmitted information takes the form of video signals or voice signals.

Limit values have been specified in the past for the purpose of avoiding excessively high jitter. Thus, for example in accordance with a specification made by the Federal German Post Office, the maximum jitter per network node must not exceed a value of 250 $\mu s$. In the case of a connection in which 6 network nodes are traversed (typical value for a national connection), the maximum jitter can consequently amount to up to 1.5 ms. If a transmission bit rate of 4 Mbit/s (corresponding to a rate of 10000 cells/s) is taken as a basis, this means that, in the extreme case, instead of 15 ATM cells, not a single ATM cell arrives in the receiving device.

German Patent Specification DE 41 32 518 C2 discloses a circuit arrangement for the transmission of digital message signals via a broadband communications system operating according to the asynchronous transfer mode. Said document discloses how the effects of jitter in a receiving device can be reduced. This is done by self-synchronization of buffer memory devices, which proves to be complicated in practice.

SUMMARY OF THE INVENTION

The invention is based on the object of specifying a method which enables the effects of jitter to be reduced further using relatively simple means.

The invention has the advantage that the interval between two successive ATM cells is determined prior to storage in the memory device of the receiving device. The intervals determined in this way are then summed over a fixedly defined plurality of ATM cells and averaging is carried out on the basis of these calculations. The average value calculated in this way is then used to read the ATM cells stored in the memory device back out of the memory device and forward them. This is associated with the advantage that the jitter is reduced.

In a development of the present invention, it is provided that the averaging of the intervals between the in each case two successive ATM cells is carried out anew each time an ATM cell arrives.

In a development of the present invention, it is provided that the averaging is carried out in that the last calculated average value of the sum of the intervals between the defined number of ATM cells is subtracted from the last calculated sum of the intervals between the defined number of ATM cells, and the newly determined interval of the ATM cell that arrived last is added. This is associated with the advantage that the respective counter readings do not have to be buffered.

In a development of the present invention, it is provided that a correction quantity is added to and/or subtracted from the averaging result whenever the occupancy of the memory device deviates from a defined value, and that the ATM cells stored in the at least one memory device are read out using the value determined in this way. This is associated with the advantage that the rounding errors which occur unavoidably during the calculation of the average value can at least partially be compensated for again. In particular, the correction quantity can be used whenever deviations from the optimum occupancy of the memory device occur.

In a development of the present invention, it is provided that the initial state is produced in that the at least one memory device is first of all only half-filled with ATM cells, the intervals are summed and the value determined in this way is extrapolated to the number of ATM cells over which averaging is carried out. This is associated with the advantage that the averaging is only carried out whenever stable conditions are achieved.

In a development of the present invention, it is provided that the interval between two successive ATM cells is determined by counting the clock pulses of a clock pulse train generated by a counting register provided on the input side of the at least one memory device, the clock rate of said clock pulse train being very much higher than the transmission rate at which the ATM cells are transmitted from the transmitting device to the receiving device. This is associated with the advantage that the error in the determination of the interval can be kept small.

In a development of the present invention, it is provided that the fixedly defined plurality of ATM cells over which averaging is calculated is a power of 2. This is associated with the advantage that the calculations can be carried out by hardware with little outlay.

In a development of the present invention, it is provided that the ATM cells are read out from the at least one memory device by loading a counting register, which is arranged on the output side of said memory device, with the average value to which the correction quantity has been applied. This is associated with the advantage that the ATM cells are read out at the average value of the jitter that has occurred.

In a development of the present invention, it is provided that the following is applicable to the dimensioning of the at least one memory device:

$$FIFO = 2 \cdot \frac{\text{maximum bitrate} \cdot \text{maximum jitter}}{\text{bits/cell}}$$

the variable FIFO has the dimension "cells". This is associated with the advantage that the memory device can be optimally adapted in terms of its storage capacity.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

The single FIGURE depicts a memory device for use with the present invention.

DESCRIPTION OF THE PREFERRED EMBODIMENTS

The FIGURE shows a memory device FIFO. This is expediently a memory device which reads incoming ATM cells in and out again according to the "first-in/first-out" principle. It is expedient to provide just a memory device FIFO having a small dimensioning. According to the FIGURE, the ATM cells output by a transmitting device arrive at the left of the memory device FIFO and are written thereto.

According to the invention, before the ATM cells are written to the memory device FIFO, the interval with respect to the preceding ATM cell is determined. This is done with the aid of a counting device, which is not shown in the FIGURE and is provided on the input side of the memory device FIFO. It should be taken into account here that the clock rate at which the counting device determines the interval is very much greater than the transmission rate of the ATM cells. The aim of the procedure according to the invention is to determine an average reception data rate A. A particularly simple realization is provided when the number of ATM cells over which averaging is carried out is a power of 2. In this case, the averaging can then be carried out by means of a simple shift operation. For example, a value can be divided by 256 by shifting this value to the right by ld 256=8 bits, where ld 256 represents the logarithm to the base two of 256.

The reception data rate is determined by buffering the counter reading of the counting device when an ATM cell arrives, and erasing the counter again. This counter reading is then incorporated into the previously determined average value in that the current average value is firstly subtracted from the sum of the intervals between the last N ATM cells, and the counter reading of the newly arrived ATM cell is added to this quantity. These operations are represented by the formula $$\text{sum}_{new} = \text{sum}_{old} - (\text{average value of sum}_{old}) + \text{counter reading}_{new}.$$

After an ATM cell has been read out from the memory device FIFO, on the output side a further counting device, which is likewise not shown in the FIGURE, is loaded with the currently determined average value, to which a correction quantity K, which is to be explained later, is applied. This counting device then reduces the loaded value at the same clock rate as the counting device on the input side. Once the value of the counting device has reached zero, the ATM cell is read out from the memory device FIFO.

However, the shift operation when calculating the average value results in a rounding error. In practice, therefore, during the calculation of the average value, rounding down of this value is performed. If this average value alone were taken as a basis for the read-out operations, this would mean that the ATM cells would be read out from the memory device FIFO too quickly. For this reason, a correction quantity K is provided, by means of which the rounding error that has occurred is corrected again. This correction quantity K is applied to the formula specified above. In practice, this means that the read-out operations are now dependent on the occupancy of the memory device. For example, the average value calculated is rounded up whenever the memory device FIFO is less than half-filled. Conversely, it is rounded down whenever the memory device FIFO is more than half-filled. However, it should be taken into account that the optimum occupancy depends on the statistical distribution of the jitter values; this means that this optimum occupancy does not necessarily have to be achieved at the half-filled level.

The procedure which has just been described is expedient particularly when a stable state has already been reached and an initial state, howsoever defined, has been left behind. In this respect, it is necessary to establish this initial state at the beginning of a transmission of ATM cells. For this reason, at the beginning of the data transmission, the memory device FIFO is half-filled with ATM cells. The counting device on the input side then sums the counter readings on the arrival of the ATM cells. The summation value determined in this way is then extrapolated to the sum of N ATM cells. Expediently, the occupancy should likewise be a power of 2. What this achieves, in a simple manner, is that this extrapolation is simple to carry out by means of an operation shifting the sum to the left. In this initial phase, it should be taken into account that the average value here is still relatively far removed from the actual average value. In this respect, a greater dependence of the average value on the occupancy of the memory device FIFO may occur at this time. If, however, the initial state has become stable as a result of the procedure described above, the method according to the invention take place according to the principle described above.

Finally, the dimensioning of the memory device FIFO will also be discussed:

As already mentioned, the jitter distribution depends on the cell rate of the ATM cells, since the ATM cells cannot overtake one another. It is admittedly possible for the jitter of the interval between one cell and the following ATM cell to shoot up from 0 to a maximum value; conversely, however, jitter can drop by no more than one cell cycle, since otherwise cells would overtake one another. For this reason, the memory device FIFO must be dimensioned in such a way that as many ATM cells can fail to appear as is the case when the jitter jumps in one go from zero to the maximum value. Consequently, the following formula can be specified for the dimensioning of the memory device FIFO:

$$FIFO = 2 \cdot \frac{\text{maximum bitrate} \cdot \text{maximum jitter}}{\text{bits/cell}}$$

In principle, in this procedure, cell losses and incorrectly routed cells can only be identified during cell cycle times which are considerably longer than the maximum jitter. This would be the case, for example, for a cell cycle time of 64 kbit/s=170 cells/s=6 ms cell cycle very much greater than 1.5 ms jitter. After the settling process, it is possible to specify a time window during which an ATM cell must arrive. If an ATM cell does not arrive during this time window, then, by definition, the ATM cell is lost. If an ATM cell arrives outside this time window, it cannot then belong to the relevant connection.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for reducing jitter of ATM cells, comprising:
   outputting ATM cells with a defined cell interval with a transmitting device;
   buffering ATM cells in a receiving device, which receives ATM cells and has at least one memory device;
   carrying out, after a defined initial state is reached and before the ATM cells are buffered in the at least one memory device, an averaging of the intervals between in each case two successive ATM cells over a defined plurality of ATM cells, the averaging being carried out in that a last calculated average value of a sum of intervals between a defined number of ATM cells is subtracted from a last calculated sum of the intervals between the defined number of ATM cells, and the newly determined interval of the ATM cell that arrived last being added; and basing read-out of the ATM cells from the at least one memory device on a result of the averaging.

2. The method as claimed in claim 1, wherein the averaging of the intervals between the in each case two successive ATM cells is carried out anew each time an ATM cell is received.

3. The method as claimed in claim 1, wherein a correction quantity is at least one of added to and subtracted from the averaging result whenever occupancy of the memory device deviates from a defined value, and wherein the ATM cells stored in the at least one memory device are read out using the resulting averaging result.

4. The method as claimed in claim 1, wherein an initial state is produced in that the at least one memory device is first only half-filled with ATM cells, intervals are summed and a value thereby determined is extrapolated to the number of ATM cells over which averaging is carried out.

5. The method as claimed in claim 1, wherein an interval between two successive ATM cells is determined by counting clock pulses of a clock pulse train generated by a counting register provided on an input side of the at least one memory device, the clock rate of said clock pulse train being higher than the transmission rate at which the ATM cells are transmitted from the transmitting device to the receiving device.

6. The method as claimed in claim 1, wherein the defined plurality of ATM cells over which averaging is calculated is a power of 2.

7. The method as claimed in claim 1, wherein the ATM cells are read out from the at least one memory device by loading a counting register, which is arranged on an output side of said memory device, with the average value to which the correction quantity has been applied.

8. The method as claimed in claim 1, wherein the at least one memory device is a first-in-first-out (FIFO) memory device defined by:

$$FIFO = 2 \cdot \frac{\text{maximum bitrate} \cdot \text{maximum jitter}}{\text{bits/cell}}.$$

* * * * *